United States Patent [19]
Tsubota et al.

[11] 3,975,338
[45] Aug. 17, 1976

[54] PROCESS OF PRODUCING VINYL CHLORIDE POLYMERS

[75] Inventors: Katsuya Tsubota, Osaka; Shigeru Motani, Settsu; Tatsuo Hasue, Toyonaka; Yasuhiro Nijima, Settsu, all of Japan

[73] Assignee: Kanegafuchi Chemical Industries Co., Ltd., Osaka, Japan

[22] Filed: Dec. 21, 1973

[21] Appl. No.: 427,172

Related U.S. Application Data

[63] Continuation-in-part of Ser. No. 370,263, June 15, 1973, abandoned.

[30] Foreign Application Priority Data

June 30, 1972   Japan.............................. 47-66056

[52] U.S. Cl................................ 526/345; 526/202; 526/209; 526/213; 526/225; 526/342; 526/343; 526/322; 526/323; 526/328; 526/330
[51] Int. Cl.²...................... C08F 1/13; C08F 3/30; C08F 15/30
[58] Field of Search............ 260/92.8 W, 86.3, 87.1, 260/87.7, 78.5 R, 78.5 CL, 85.5 XA

[56] References Cited

UNITED STATES PATENTS

| | | | |
|---|---|---|---|
| 3,332,875 | 7/1967 | Kessler............................... | 252/137 |
| 3,546,193 | 12/1970 | Benetta............................... | 260/92.8 |

*Primary Examiner*—Christopher A. Henderson, Jr.
*Attorney, Agent, or Firm*—Sughrue, Rothwell, Mion, Zinn & Macpeak

[57] ABSTRACT

A vinyl chloride polymer for providing a vinyl chloride paste which has a good thermal stability, a stability to sol viscosity and an excellent air release capability in the natural state or in a short period of time under a moderately low pressure is produced by using, in the production thereof, as an emulsifying agent, the alkali metal salts and/or ammonium salts of a mixture of a major amount of olefin alkyl sulfonates and a minor amount of hydroxyalkyl sulfonates (hereinafter olefin alkyl/hydroxyalkyl sulfonates) having from about 8 to 20 carbon atoms, in the polymerization thereof or in the preparation of a vinyl chloride paste from the polymerized product.

12 Claims, No Drawings

3,975,338

PROCESS OF PRODUCING VINYL CHLORIDE POLYMERS

CROSS-REFERENCE TO RELATED APPLICATIONS

This application is a continuation-in-part application of copending application, Ser. No. 370,263, filed June 15, 1973, now abandoned.

BACKGROUND OF THE INVENTION

1. Field of the Invention

The present invention relates to a process of producing a vinyl chloride paste.

2. Description of the Prior Art

It is known that by using vinyl chloride paste resins in the form of small particles (that is, about 0.1 – 2 microns) relatively stable dispersions of the paste resin in a plasticizer may be formed, which dispersions are gellable on heating to yield a protective coating or articles.

In the case of preparing a vinyl chloride resin sol by blending a plasticizer, a stabilizer, etc., with a vinyl chloride paste resin and mixing by stirring, if the mixture contains foam, the interior and the surface appearance of the final product are degraded, which results in reducing the commercial value of the products.

If the thermal stability of the plastisol is poor, dechlorination occurs upon gelatinization and melting of the plastisol thereby deteriorating the physical properties of the resulting articles.

Further, the plastisol must generally have a initial viscosity as low as less than 8000 cps and be stable. Generally, 1 week after preparation of the sol, the sol viscosity must be less than 10,000 cps.

Furthermore, the mechanical properties of the products are reduced, and hence the mixture is usually subjected to an air release procedure or "defoaming" under vacuo during kneading or after kneading. However, such an air release operation requires great effort and long periods of time, which greatly reduces the workability of prior art processes.

A vinyl chloride paste resin has usually been prepared by an emulsion polymerization method using a water-soluble catalyst or polymerizing vinyl chloride by homogenizing the reaction mixture using an oil-soluble catalyst. In the polymerization, a anionic surface active agent such as an alkali metal salt or an ammonium salt of a higher alcohol sulfonic acid ester or an alkylbenzene sulfonate has been used as an emulsifying agent.

The vinyl chloride polymer latex prepared by such an emulsion polymerization is dried by means of spray drying and the like, but to provide mechanical stability to the latex at drying or to reduce the viscosity of the sol prepared from the vinyl chloride resin, a proper amount of the aforesaid anionic surface active agent or a nonionic surface active agent such as a polyoxyethylene alkyl ether, polyoxyethylene-polyoxypropylene block copolymer, sorbitan ester, glycerine alkyl ester, etc., is sometimes added.

However, in the conventional production processes using the above-described emulsifying agent for polymerization or preparation, the air release capability of the sol is poor, and hence such a paste resin is of inferior quality.

SUMMARY OF THE INVENTION

Such difficulties in conventional processes are overcome by the present invention, that is, by the process of this invention a (poly)vinyl chloride paste resin which yields an organosol or a plastisol which has an excellent thermal stability, stability to sol viscosity and air release capability in the natural state or under vacuum, without the necessity of conducting the air release procedure for a long period of time at extremely low pressure as is the case in conventional process, is obtained.

The inventors, therefore, conducted investigations to improve the thermal stability, the stability to sol viscosity and the poor air release capability of conventional paste resins, and, as a result, discovered a process of producing a paste resin capable of providing a plastisol having good thermal stability, stability to sol viscosity and air release capability. That is, according to the present invention, there is provided a process of producing a vinyl chloride resin or polymer for vinyl chloride paste capable of providing a sol having good thermal stability, stability to sol viscosity and air release capability in the natural state and under vacuum, which comprises using, in the production of the vinyl chloride resin or polymer, an emulsifying agent comprising the alkali metal salts or ammonium salts of a mixture of a major amount of a mixture of long chain olefin alkyl sulfonates and a minor amount of a mixture of long chain hydroxyalkyl sulfonates having from about 8 to 20 carbon atoms for the polymerization or the preparation thereof.

In a most highly preferred and specific embodiment, the present invention provides an improved process for polymerizing vinyl chloride monomer per se, that is, to form a vinyl chloride homopolymer, which process provides a vinyl chloride resin or polymer for vinyl chloride paste which is capable of providing a sol having improved thermal stability, improved stability to sol viscosity and extremely improved air release capability, which process comprises using in the polymerization of the vinyl chloride monomer the alkali metal salts or ammonium salts of the olefin alkyl/hydroxyalkyl sulfonate mixture as described above.

DETAILED DESCRIPTION OF THE INVENTION

As indicated above, the present invention relates to the polymerization and the preparation of a vinyl chloride paste having improved thermal stability, stability to sol viscosity and air release capability superior to any similar material heretofore produced by prior art processes.

As is known in the art, the term "vinyl chloride paste" or merely "sol" is an abbreviation for a plastisol or organosol of a (poly)vinyl chloride paste resin (the polymer per se) as derived from emulsion polymerization and a plasticizer.

In accordance with the present invention, the (poly)-vinyl chloride paste resin is obtained by polymerization in the presence of a specific emulsifying agent and/or the vinyl chloride paste is prepared in the presence of a specific emulsifying agent.

As compared to merely using the specific emulsifying agent for the preparation of the vinyl chloride paste, a more superior product is obtained when the specific emulsifying agent is used for the polymerization. However, most superior effects are obtained when the specific emulsifying agent is used for both the polymerization and the preparation. In forming a vinyl chloride paste, the amount of plasticizer is usually from about 30 to about 150, preferably 50 to 100, parts by weight per 100 parts by weight of the (poly)vinyl chloride paste resin.

The plasticizer used in accordance with the present invention is not overly critical, and can be freely selected from plasticizers used in the art to form vinyl chloride pastes since the main feature of the present invention resides in the polymerization in the presence of a specific emulsifying agent, and, to a secondary degree since the effects are not so great, to the preparation of the vinyl chloride paste from a (poly)vinyl chloride paste resin. Thus, it will be understood by one skilled in the art that the exact plasticizer chosen is not overly important.

The vinyl chloride paste obtained in accordance with the present invention shows an excellent air release capability in either the natural state or under vacuum. "In the natural state" merely means permitting the vinyl chloride paste to openly stand under normal pressure whereupon air is released, and "under vacuum" merely means that standing is under a pressure less than 760 mmHg.

A plastisol comprises the (poly)vinyl chloride paste resin and a plasticizer (with optional stabilizer(s), pigments(s), filler(s) and the like), while exactly speaking an organosol is such a plastisol and diluent. It shall be completely understood, however, that both such embodiments are within the scope of the present invention.

While one skilled in the art will appreciate that a great number of plasticizers as are known to the art can be used in the present invention, examples of preferred plasticizers include those selected from phthalic acid esters (for example, dimethyl, diethyl, dibutyl, dihexyl and dioctyl phthalate), aliphatic dibasic acid esters (for example, diisodecyl succinate, diisodecyl adipate and dioctyl sebacate), phosphates (for example, tricresyl phosphate), fatty acid esters (for example, butyl oleate and methyl acetylricinolate), polyhydric alcohol esters (such as diethylene glycol dibenzoate and pentaerythritol methyl ester), epoxy compounds (for example, epoxidized soybean oil) and polyesters.

The amount of the plasticizer is 30 to 150, preferably 45 to 90 parts by weight per 100 parts by weight of the (poly)vinyl chloride paste resin.

The stabilizer as is optionally used in the present invention may be selected from stabilizers known in the art for this purpose. Typical examples of such stabilizers are the metallic soaps such as calcium, barium, zinc and lead stearate, organic tin stabilizers such as dibutyl tin dimaleate or dibutyl tin dilaurate, chelates such as ethylene diamine tetraacetate and the like. The stabilizer is added to prevent coloration of the vinyl chloride series resin as a result of thermal decomposition or photodegradation when a plastisol or organosol of the vinyl chloride series resin is gelled by heating.

The amount of the stabilizer is generally from about 0.1 to about 10 parts by weight per 100 parts by weight of the (poly)vinyl chloride paste resin. Seldom will one use significantly lesser amounts of stabilizer to be assured of achieving the desired effect.

The pigment can be added as desired, but care must be exercised to avoid the incorporation of a noxious metal component when the final product is intended for use with foodstuffs or as a toy.

The pigments used are typically metallic oxides and organic pigments, the amount of pigment generally being from 1 to 10 parts by weight per 100 parts by weight of the (poly)vinyl chloride paste resin.

The diluent is used, if desired, to control the viscosity of the plastisol or organosol. It is generally a petroleum-type hydrocarbon having a boiling point of about 50° to 250°C. For fire-retarding purposes, trichloroethylene or tetrachloroethylene may be employed.

The filler may, for example, be calcium or clay, and is usually added in an amount of 0 to 200 parts by weight per 100 parts by weight of the (poly)vinyl chloride paste resin.

The above-described ingredients are uniformly mixed using an agitator such as a pulverizer, kneader, HOBART mixer, roll mill or ball mill, etc., to form an organosol or plastisol.

The diluent is merely used in amounts sufficient to provide the desired organosol viscosity.

So as to further delineate the primary feature of the present invention, "in the polymerization" means using a specific emulsifying agent or agents (either alone or in combination with a prior art emulsifying agent as discussed in this specification) of the present invention for the polymerization of vinyl chloride monomer (either alone or in combination with a monomer copolymerizable therewith, e.g., a monoolefinic monomer) to a (poly)vinyl chloride paste resin, whereby an extremely stable polymerization is obtained.

On the other hand, "use in the preparation" implies the processing steps subsequent to the polymerization where the emulsifying agent is added to, e.g., the latex from the polymerization for the purpose of obtaining good characteristics such as good mechanical stability for the latex, good air release capability for the resulting sol (vinyl chloride paste, be it an organosol or plastisol), improved thermal stability, improved stability to sol viscosity and good electrical properties for the final product, for instance, a gelled product used as a protective coating or article. The specific emulsifying agents of this invention are thus used in this aspect in any and all processing sequences from the latex stage to the vinyl chloride paste stage, e.g., during drying, pulverizing, and other procedures as are used by the art to form a vinyl chloride paste from the vinyl chloride paste resin, and to provide a superior paste. Practically speaking, this will mean taking the latex from the polymerization and at that stage adding the emulsifying agent or agents thereto to obtain full benefits during the normally used drying (e.g., spray drying, tray drying, etc.) and subsequent pulverizing procedures, and then blending with the plasticizer, etc.

In this latter embodiment, where the specific emulsifying agent or agents is/are used only "in the preparation" of the vinyl chloride paste, a prior art emulsifying agent can be used along in the polymerization. However, as indicated, this is not a preferred embodiment since the results achieved are not as good as where the specific emulsifying agent(s) of this invention is/are used in the polymerization or, better yet, in the polymerization and in the preparation.

In all these aspects, the emulsifying agent of the present invention does, however, provide results superior to emulsifying agents as are commonly used in the art. The emulsifying agent of the present invention further shows a lower toxicity than conventional emulsifying agents and is readily decomposed by microorganisms, so that wastes containing the emulsifying agent of the present invention can easily be treated.

The above described alkali metal salts or ammonium salts of the olefin alkyl/hydroxyalkyl sulfonate mixture can be used as an emulsifying agent for the polymerization or the preparation in the emulsion polymerization of vinyl chloride without being accompanied by problems encountered with the use of a common prior art anionic emulsifying agent such as an alkali metal salt or an ammonium salt of a higher alcohol sulfonic acid ester, an alkyl benzene sulfonate, or a dialkyl sulfosuccinate, but particularly excellent effects can be obtained when such an emulsifying agent is used for the polymerization. That is, in such a case the sol prepared using the paste resin produced by the process of this invention has good air release capability and almost no polymer scale is formed during the polymerization using the aforesaid emulsifying agent.

As described above the emulsifying agent of this invention comprises a mixture of a major amount of various olefin alkyl sulfonates and a minor amount of various hydroxyalkyl sulfonates along with very small amounts of other sulfonation products, impurities, etc. The mixture is difficult if not impossible to describe unequivocally but can best be represented as a mixture comprising in excess of at least about 50% by weight, more generally around 65% by weight of a mixture of olefin alkyl sulfonates such as α-olefin alkyl sulfonates, β-olefin alkyl sulfonates and γ-olefin alkyl sulfonates, and a minor amount, generally less than 50% by weight, more generally around 35% by weight of a mixture of hydroxyalkyl sulfonates such as γ-hydroxyalkyl sulfonates and δ-hydroxyalkyl sulfonates. For example, a typical composition of the emulsifying agent of this invention might be as follows.

| | |
|---|---|
| Olefin alkyl sulfonate | 65% |
| α-olefin alkyl $R-CH_2CH_2CH=CH-SO_3M$ | 15% |
| β-olefin alkyl $R-CH_2CH=CHCH_2-SO_3M$ | 35% |
| γ-olefin alkyl $R-CH=CHCH_2CH_2-SO_3M$ | 15% |
| Hydroxyalkyl sulfonate | 35% |
| γ-hydroxyalkyl $RCH_2CH(OH)CH_2CH_2-SO_3M$ | }—35% |
| δ-hydroxyalkyl $RCH(OH)CH_2CH_2CH_2-SO_3M$ | |

R in the above formulae represents a straight chain aliphatic hydrocarbon group having about 4 to 16 carbon atoms (i.e., about 8 to 20 total carbon atoms in the sulfonate) and M represents an alkali metal atom or an ammonium group. Suitable examples of alkali metals are sodium and potassium and suitable examples of ammonium groups are an ammonium group and various amine salts such as the triethanol amine salt, the diethanol amine salt and the monoethanol amine salt. Basically, these sulfonates are used in a salt form which is water soluble and can include some minor amount of unneutralized or free acid sulfonate. Some of the emulsifying agents of this invention are commercially available or the emulsifying agent of this invention can be prepared using well known procedures in the art. One method of preparing the emulsifying agent of this invention is by sulfonating an α-olefin having 8 to 20 carbon atoms and then hydrolyzing the product in the presence of an alkali.

In practice, these components and their ratios will very somewhat depending upon the sulfonation conditions employed in their production, the number of carbon atoms in the alkyl chain, the starting material composition and the like. As long as the emulsifying agent comprises substantially a major amount of olefin sulfonates, these variations are relatively minor in terms of the effects that they produce and from a performance standpoint can be substantially ignored.

The amount of emulsifying agent used in emulsion polymerization is generally 0.05 to 5.0% by weight of the monomer polymerized, and 0.001 to 1.0% by weight of the polymer in the latex when it is used as an emulsifying agent for the preparation.

The amount of the emulsifying agent of this invention is preferably 0.1 to 2.0% by weight of the monomer polymerized when it is used as the emulsifying agent for the polymerization, and 0.01 to 1.0% by weight of the polymer in the latex when it is used as the emulsifying agent for the preparation.

Further, when the polymerization is carried out using a mixture of the emulsifying agent of this invention and some other generally used anionic and/or nonionic emulsifying agent, the air release capability of the sol prepared with the paste resin obtained is good. However, it is preferred that the emulsifying agent of this invention comprises at least 50% by weight of the total emulsifying agent used in the polymerization or the preparation when a mixture thereof with conventional emulsifying agents as described is used. Proportions as above suffice for the mixture.

While the above discussion has been primarily in terms of using one emulsifying agent of the present invention, it will be apparent to one skilled in the art that mixtures of more than one emulsifying agent in accordance with the present invention can be used with mixtures of more than one prior art emulsifying agent. In a similar manner, if only emulsifying agents of the present invention are used, mixtures thereof can be used. In this case, the above percentage guide lines are most preferably followed, of course.

Any emulsion polymerization method ordinarily employed for producing vinyl chloride polymers for paste use can be employed in this invention, for example, a seeded polymerization method, an emulsifier addition method and the polymerization method involving homogenizing using an oil-soluble catalyst.

Phrased somewhat differently, the present invention is not limited in any manner whatsoever as to the exact type of emulsion polymerization under consideration since in all such polymerizations where an emulsifying agent is used the emulsifying agents of the present invention will provide the improved results heretofore described. Thus, where an emulsifying effect is important, the present invention brings about an improvement. Representative of the many polymerization methods in which the emulsifying agents of the present invention can be used are those described in U.S. Pat. No. 3,551,399 (relating to emulsion polymerizations using an oil-soluble peroxide and homogenization; the emulsifying agents of this invention are especially useful as the sole emulsifying agent therein, even at a wider percentage range) and U.S. Pat. Nos. 3,324,097 and 2,520,959. In addition, needless to say, typical emulsion polymerization procedures are not only disclosed in the patent literature but also in non-patent literature, for instance, as disclosed in I.M. Kolthoff, E. J. Meehan and C. W. Carr, *Journal of Polymer Science*, 7, 577 (1951), which teaches methods of seeded polymerization.

The term "vinyl, or (poly)vinyl chloride paste resin" as is used in the present specification and claims includes not only vinyl chloride homopolymers for a vinyl chloride paste (hereinafter often merely identified as "for paste") but also includes vinyl chloride copolymers for paste. The copolymers contain not less than 50% by weight vinyl chloride, more preferably not less than 70% by weight vinyl chloride, copolymerized with a mono-olefinic monomer which has the capability of copolymerizing with vinyl chloride. Such materials are well known in the art and include, for example, vinyl acetate, vinylidene chloride, acrylonitrile, acrylic esters, acids such as maleic acid and the like.

Further, during the polymerization a higher aliphatic acid such as palmitic acid, stearic acid, etc.; a higher alcohol such as dodecyl alcohol, stearyl alcohol, etc.; a metal salt such as sodium sulfate, sodium phosphate, etc.; or a hydrocarbon such as an alkylbenzene, dodecane, etc., can be used as a dispersion stabilization aid together with the emulsifying agent. Moreover, the aforesaid nonionic emulsifying agents can be used together with the above described emulsifying agent of this invention.

The invention will now be illustrated in more detail by the following examples.

EXAMPLE 1

In a 300 liter glass-lined autoclave were placed 125 Kg of deionized water and 5 Kg (containing 2 Kg of polyvinyl chloride polymer) of a latex of uniform vinyl chloride seed polymer particles having a particle size of 0.4 microns. After removing oxygen therefrom, 100 Kg of vinyl chloride monomer was added to the mixture.

Then, the polymerization reaction was carried out at about 50°C at 7.5 Kg/cm²G with potassium persulfate in an amount of 0.05% (3.5 g/hr) by weight of the vinyl chloride monomer being added continuously to the autoclave over the total polymerization period.

Furthermore, from the time the polymerization was allowed to proceed to 18% (18% by weight monomer converted to polymer) until the time when the polymerization was completed, the emulsifying agent shown in Table 1 below was continuously added to the autoclave at a rate of 0.025% per hour (total of 0.35%) by weight of the vinyl chloride monomer.

After 14 hours, the polymerization was stopped and unreacted monomer recovered. Any polymer scale in the latex or attached to the propeller and the wall of the polymerization autoclave was collected, dried, and weighed.

The latex obtained was spray-dried at constant conditions and pulverized to provide a vinyl chloride resin.

The amount of polymer scale, and the air release capability in the natural state (free air release capability) and the air release capability under vacuum (forced air release capability) of the sol prepared using each of the paste resins thus produced are shown in the following table.

Table 1

| Polymer | Emulsifying Agent | Polymer Mean Particle Size ($\mu$) | (a) | (b) | (c) |
|---------|-------------------|-----------------------------------|-----|-----|-----|
| A | Sodium $C_{14}$ olefin alkyl/hydroxyalkyl sulfonate | 0.8 | 0.1 | 4 | 0 |
| B | Sodium $C_{12}$ olefin alkyl/hydroxyalkyl sulfonate | 0.8 | 0.05 | 1 | 0 |
| (Comparison Example) | | | | | |
| C | Sodium dodecylbenzenesulfonate | 0.8 | 0.5 | 30 | 18 |
| D | Sodium laurylsulfate | 0.8 | 0.4 | 12 | 5 |

(a): The amount of polymer scale as a percentage of monomer weight; (b): Free air release capability; and (c): Forced air release capability.

Free and forced air release capability shown were tested in the following manners:

After 60 g of the vinyl chloride paste resin, 40 g of dioctyl phthalate, and 1 g of a Cd-Ba-Zn liquid stabilizer were mixed, the resulting plastisol was placed in a 500 ml beaker. (In case of forced air release capability, the 500 ml beaker containing the sol was placed in a reduced pressure desiccator and the sol was defoamed for 5 minutes under a vacuum of 50 mmHg.

In each case, the sol was allowed to stand for 1 hour at room temperature, cast on a glass plate, and after adjusting the thickness of the sol on the glass plate by means of a doctor blade to 0.2 mm, the sol was gelled for 5 minutes at 170°C in an oven. Then, the number of foams contained in circles 0.5 mm in diameter at three arbitrary points of the film thus obtained were counted by means of a microscope, and the mean value used. The lower the number of foams, the better the free or forced air release capability.

From the results shown in Table 1, it is clear that when sodium olefin alkyl/hydroxyalkyl sulfonates were used as the emulsifying agent, the sol of the vinyl chloride paste had excellent free and forced air release capability, and further the amount of scale at polymerization was low.

EXAMPLE 2

In a 300 liter glass-lined autoclave were placed 200 Kg of deionized water, 100 Kg of vinyl chloride monomer, $\alpha,\alpha'$-azobisbutyrovaleronitrile in an amount of 0.05% by weight of the monomer, cetyl alcohol in an amount of 0.6% by weight of the monomer, and the emulsifying agent shown in Table 2 in an amount of 0.6% by weight of the monomer, and the polymer solution formed was stirred for 3 hours at room temperature by means of a homogenizer to homogenize the same.

Then, polymerization was carried out at about 50°C and 7.5 Kg/cm²G for 13 hours, when polymerization was completed.

In each case, almost no polymer scale was observed in the latex formed and further almost no polymer scale was observed on the propeller and the wall of the polymerization vessel.

A paste resin was obtained from the latex in the same manner as in Example 1 and the free and forced air release capability thereof measured as in Example 1. The results are shown in Table 2.

Table 2

| Polymer | Emulsifying Agent | Polymer Mean Particle Size (μ) | (b) | (c) |
|---|---|---|---|---|
| E | Sodium C$_{18}$ olefin alkyl/hydroxyalkyl sulfonate | 0.8 | 0 | 0 |
| F | Sodium C$_{14}$ olefin alkyl/hydroxyalkyl sulfonate | 0.8 | 0 | 0 |
| (Comparison Example) | | | | |
| G | Sodium dodecylbenzene-sulfonate | 0.8 | 31 | 18 |
| H | Sodium laurylsulfate | 0.8 | 19 | 10 |

(b) and (c) have the same significance as in Table 1.

EXAMPLE 3

The same polymerization method as in Example 2 was carried out using 90 Kg of vinyl chloride monomer and 10 Kg of vinyl acetate monomer (100 Kg of total monomer) instead of 100 Kg of vinyl chloride monomer. In each case, almost no polymer scale was observed on the propeller and the wall of the polymerization vessel. A paste resin was obtained from the latex in the same manner as in Example 1 and the free and forced air release capability thereof measured as in Example 1.

The results obtained are shown in Table 3.

Table 3

| Polymer | Emulsifying Agent | Polymer Mean Particle Size (μ) | (b) | (c) |
|---|---|---|---|---|
| I | Sodium C$_{18}$ olefin alkyl/hydroxyalkyl sulfonate | 0.8 | 0 | 0 |
| J | Sodium C$_{14}$ olefin alkyl/hydroxyalkyl sulfonate | 0.8 | 0 | 0 |
| (Comparison Example) | | | | |
| K | Sodium dodecylbenzene-sulfonate | 0.8 | 4.6 | 19 |
| L | Sodium laurylsulfate | 0.8 | 20 | 6 |

(b) and (c) have the same significance as in Table 1.

From Table 2 and Table 3, it is clear that the products prepared according to the process of this invention have excellent free and forced air release capability.

Also, on comparing Example 2 and Example 3 to the seeded polymerization of Example 1, the Comparison Examples in Example 2 and Example 3 were better in free and forced air release capability than the Comparison Examples in Example 1, but the free and forced air release capability of the products prepared by the polymerization method using the oil-soluble catalyst and the emulsifying agent according to the present invention were for more excellent.

EXAMPLE 4

To the latexes of polymers A, C, D, G and H prepared in Examples 1 and 2 there was added sodium C$_{12}$ olefin alkyl/hydroxyalkyl sulfonate in an amount of 0.1% of the polymer weight as the emulsifying agent for the preparation of the vinyl chloride paste, and then the latexes were dried and pulverized as in Example 1 to provide vinyl chloride paste resins A$_1$, C$_1$, D$_1$, G$_1$ and H$_1$, respectively.

Furthermore, by adding each of the emulsifying agents for polymerization used in the case of producing polymers C, D, G, and H in Examples 1 and 2 to each of the latexes of polymers C, D, G and H, respectively, as the emulsifying agent for preparation in an amount of 0.1% of the polymer weight, there were provided paste resins C$_2$, D$_2$, G$_2$ and H$_2$.

The free and forced air release capability of the sols obtained from the paste resins thus prepared were measured in the same manner as in Example 1, the results of which are shown in Table 4.

Table 4

| Polymer | Emulsifying Agent | (b) | (c) |
|---|---|---|---|
| A$_1$ | Sodium C$_{12}$ olefin alkyl/hydroxyalkyl sulfonate | 0 | 0 |
| C$_1$ | '' | 10 | 3 |
| D$_1$ | '' | 4 | 1 |
| G$_1$ | '' | 9 | 3 |
| H$_1$ | '' | 5 | 1 |
| (Comparison Examples) | | | |
| C$_2$ | Sodium dodecylbenzene sulfonate | many | many |
| D$_2$ | Sodium laurylsulfate | 19 | 8 |
| G$_2$ | Sodium dodecylbenzene sulfonate | many | many |
| H$_2$ | Sodium laurylsulfate | 28 | 13 |

(b) and (c) have the same significance as in Table 1.

From the above results, it can be understood that the emulsifying agents used in this invention are also quite effective for providing a sol having excellent air release capability when they were used as the emulsifying agent for the preparation.

EXAMPLE 5

In a 50 liter glass-lined autoclave were placed 27 Kg of deionized water, 18 Kg of vinyl chloride monomer, 2,2'-azobisisobutyrovaleronitrile in an amount of 0.03% by weight of the monomer, cetyl alcohol in an amount of 0.8% by weight of the monomer, stearic acid in an amount of 0.2% by weight of the monomer and the emulsifying agent shown in Table 5 below in an amount of 0.7% by weight, and the resulting polymer solution was stirred for 3 hours using a homogenizer. Thereafter, the temperature of the homogenate was increased to 45°C to allow the same to polymerize until the point where the polymerization pressure was reduced by 1 Kg/cm$^2$ from the saturated vapor pressure of vinyl chloride at 45°C. The polymerization time was 14 hours. Viscosity of the polymer latex obtained 12 hours after the beginning of the polymerization reaction was determined and the polymer scale in the polymer solution after completion of the polymerization and the polymer scale deposited on the propeller and the wall of the polymerization vessel were collected and dried, and the amounts thereof were determined. The thus obtained latex was spray-dried at constant conditions and then pulverized to obtain a paste resin.

100 parts of the above obtained paste resin, 60 parts of dioctylphthalate and 3 parts of a Cd-Ba-Zn liquefied emulsifying agent were blended into a paste, and the change in the sol viscosity thereof with the lapse of time was determined, with the results being shown in Table 6 below. Further, the plastisol was spread onto a glass plate and formed into a film having a thickness of 1 mm using a doctor blade. The film was then gelatinized using a drier supplying a uniform heat at 180°C for 10 minutes followed by placing in an oven maintained at 170°C while determining the thermal stability of the emulsifying agent by measuring the time until the film turned black brown. The results obtained are shown in Table 5 below.

Table 5

| Polymer | Emulsifying Agent | Average Particle Size ($\mu$) | Latex*) Particle Size (cps) | Thermal Stability (min) |
|---|---|---|---|---|
| A | Sodium $C_{14}$ olefin alkyl/hydroxyalkyl sulfonate | 0.8 | 8.5 | 180 |
| B | Sodium $C_{12}$ olefin alkyl/ hydroxyalkyl sulfonate | 0.8 | 9.3 | 180 |
| C (Comparison) | Sodium dodecylbenzene sulfonate | 0.8 | 45.0 | 105 |
| D (Comparison) | Sodium laurylsulfate | 0.8 | 19.1 | 75 |

*)BL-type viscometer, Rotor No. 1 measured at a rate of 60 r.p.m.

Table 6

| | Change in Sol Viscosity**) with Lapse of Time Age (Days) | | | |
|---|---|---|---|---|
| Polymer | 1 | 3 | 7 | 14 |
| A | 2120 | 2300 | 2300 | 2360 |
| B | 2020 | 2180 | 2260 | 2300 |
| C | 2840 | 3660 | 4200 | 5120 |
| D | 8240 | 10200 | 14600 | 18300 |

**)BM-type viscometer, measured at a rate of 6 r.p.m.

While the invention has been described in detail and with reference to specific embodiments thereof, it will be apparent to one skilled in the art that various changes and modifications can be made therein departing from the spirit and scope thereof.

What is claimed is:

1. In a method of producing a polyvinyl chloride paste resin which has improved thermal stability, improved stability to sol viscosity and good free and forced air release capability, wherein the polyvinyl chloride paste resin is produced by the polymerization of vinyl chloride, the improvement wherein the polymerization is conducted in the presence of an emulsifying agent which contains as a major component (1) components selected from the group consisting of alkali metal salts and ammonium salts of an olefin alkyl sulfonate and mixtures thereof, and as a minor component (2) a minor amount of a hydroxyalkyl sulfonate; both components (1) and (2) having from about 12 to 18 carbon atoms in the alkyl moiety; said emulsifying agent being produced by sulfonating an $\alpha$-olefin having 12 to 18 carbon atoms, and then hydrolyzing the sulfonated product in the presence of an alkali.

2. The process as claimed in claim 1, wherein said alkyl moiety has about 12 to 16 carbon atoms.

3. The process of claim 1, wherein 100 parts by weight of said polyvinyl chloride paste resin is combined with 30 to 150 parts by weight of a plasticizer to form a plastisol.

4. The process of claim 1, wherein said polymerization is conducted with vinyl chloride monomer only.

5. The process of claim 1, wherein said polymerization is conducted with at least 50% by weight vinyl chloride monomer, the balance consisting of monomers selected from the group of vinyl acetate, vinylidene chloride, acrylonitrile, acrylic esters and maleic acid.

6. The process as claimed in claim 1, wherein the emulsion polymerization is a catalytic copolymerization using a water soluble catalyst.

7. The process as claimed in claim 1, wherein said emulsifying agent is used in an amount of from 0.05 to 5.0% by weight of the monomers polymerized.

8. The process as claimed in claim 1, wherein said emulsifying agent is employed in combination with conventional emulsifying agents selected from the group of alkali metal salts of higher alcohol sulfonic acid esters, ammonium salts of higher sulfonic acid esters, alkyl benzene sulfonate, dialkyl sulfosuccinate, polyoxyethylene alkyl ether, polyoxyethylene-polyoxypropylene block copolymer, sorbitan ester, and glycerine alkyl ester; said mixture of said olefin alkyl sulfonate and said hydroxyalkyl sulfonate being used in an amount of at least 50% by weight of the total weight of the combination of emulsifying agents.

9. The process as claimed in claim 1 wherein the emulsion polymerization is a seeded emulsion polymerization.

10. The process as claimed in claim 1 wherein the emulsion polymerization is a catalytic polymerization using an oil soluble catalyst.

11. In a method of producing a polyvinyl chloride past resin which has improved thermal stability, improved stability to sol viscosity and good free and forced air release capability, wherein the polyvinyl chloride paste resin is produced by the polymerization of vinyl chloride, the improvement wherein the preparation of the polyvinyl chloride paste resin includes the adding to a polyvinyl chloride latex an emulsifying agent which contains as a major component (1) components selected from the group consisting of alkali metal salts and ammonium salts of an olefin alkyl sulfonate and mixtures thereof, and as a minor component (2) a minor amount of a hydroxyalkyl sulfonate; both components (1) and (2) having from about 12 to 18 carbon atoms in the alkyl moiety; said emulsifying agent being produced by sulfonating an α-olefin having 12 to 18 carbon atoms, and then hydrolyzing the sulfonated product in the presence of an alkali.

12. The process as claimed in claim 11, wherein said emulsifying agent is used in an amount of from 0.001 to 1.0% weight of the polymer latex resulting from the polymerization.

* * * * *